US010037338B1

United States Patent
Ruben et al.

(10) Patent No.: US 10,037,338 B1
(45) Date of Patent: Jul. 31, 2018

(54) METHOD AND SYSTEM FOR CLIENT-SERVER COMMUNICATION IN A CACHED COMMUNICATION ENVIRONMENT

(75) Inventors: Darlene J. Ruben, Manchester, NH (US); William D. Berry, Brookline, NH (US); Peter Spooner, Hollis, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 13/431,011

(22) Filed: Mar. 27, 2012

(51) Int. Cl.
*G06F 15/16* (2006.01)
*G06F 17/30* (2006.01)
*H04L 29/06* (2006.01)

(52) U.S. Cl.
CPC ........ *G06F 17/30174* (2013.01); *H04L 67/42* (2013.01)

(58) Field of Classification Search
CPC .......................... G06F 17/30174; H04L 67/42
USPC ................................................. 709/203, 223
See application file for complete search history.

(56) References Cited

U.S. PATENT DOCUMENTS

| 5,920,725 | A * | 7/1999 | Ma ........................... G06F 8/67 |
| | | | 707/999.202 |
| 7,526,561 | B2 | 4/2009 | Bloch et al. |
| 8,516,050 | B1 | 8/2013 | Chapweske et al. |
| 2004/0127242 | A1 * | 7/2004 | Dashevsky et al. .......... 455/502 |
| 2005/0120355 | A1 | 6/2005 | Kraft et al. |
| 2008/0104206 | A1 * | 5/2008 | Novik .................. G06Q 10/107 |
| | | | 709/220 |
| 2009/0216815 | A1 * | 8/2009 | Braginsky et al. ........... 707/203 |
| 2014/0143283 | A1 * | 5/2014 | Sim-Tang ......... G06F 17/30292 |
| | | | 707/802 |

* cited by examiner

*Primary Examiner* — Shukri A Taha
*Assistant Examiner* — Farhad Ali
(74) *Attorney, Agent, or Firm* — Dergosits & Noah LLP; Todd A. Noah

(57) ABSTRACT

Client-server communication in a cached communication environment is described. A server computer executes a server application. The server application requests a server communication application to generate a server object. The server object is independent from a client object that is modified to communicate client data. The server application receives a copy of a client object from the server communication application, and applies a disposition rule to data referenced in the copy of the client object.

13 Claims, 3 Drawing Sheets

METHOD AND SYSTEM FOR CLIENT-SERVER COMMUNICATION IN A CACHED COMMUNICATION ENVIRONMENT

BACKGROUND

A client-server model is a computing model which partitions tasks or workloads between the providers of a resource or service, called servers, and resource or service requesters, called clients. Clients and servers communicate over a computer network. A server is a host computer that runs server programs which share their resources or services with clients. Typically, a client does not share any of its resources or services, but requests a server's resource or service functions. Clients initiate communication sessions with servers which await incoming requests. Functions such as email exchange, web access, and database access are typically built on the client-server model.

Some clients offer their users the option to operate in an "online communication" mode or a "cached communication" mode. In the online communication mode, the client provides the user with access to the user's communications only when the client is communicating online with a server that stores the user's communications. In the cached communication mode, the client may locally store, or cache, at least some of the user's communications, thereby providing the user with access to at least some of the user's communications even when the client is not engaged in online communications with the server that stores the user's communications. Many client-server models that offer a cached communications mode communicate between the client and the server by writing data to and reading the data from an object provided by a communication application. In computer science, an object is any entity that can be modified by the commands of a programming language. Examples of an object include a value, a variable, a function, and a data structure. However, both the client and the server may modify their own copy of the object when the client and server are offline. Consequently, the reestablishment of online communication between the client and the server may result in the loss of data in the objects due to differences between the client's modification to the client copy of the object and the server's modification to the server copy of the object.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
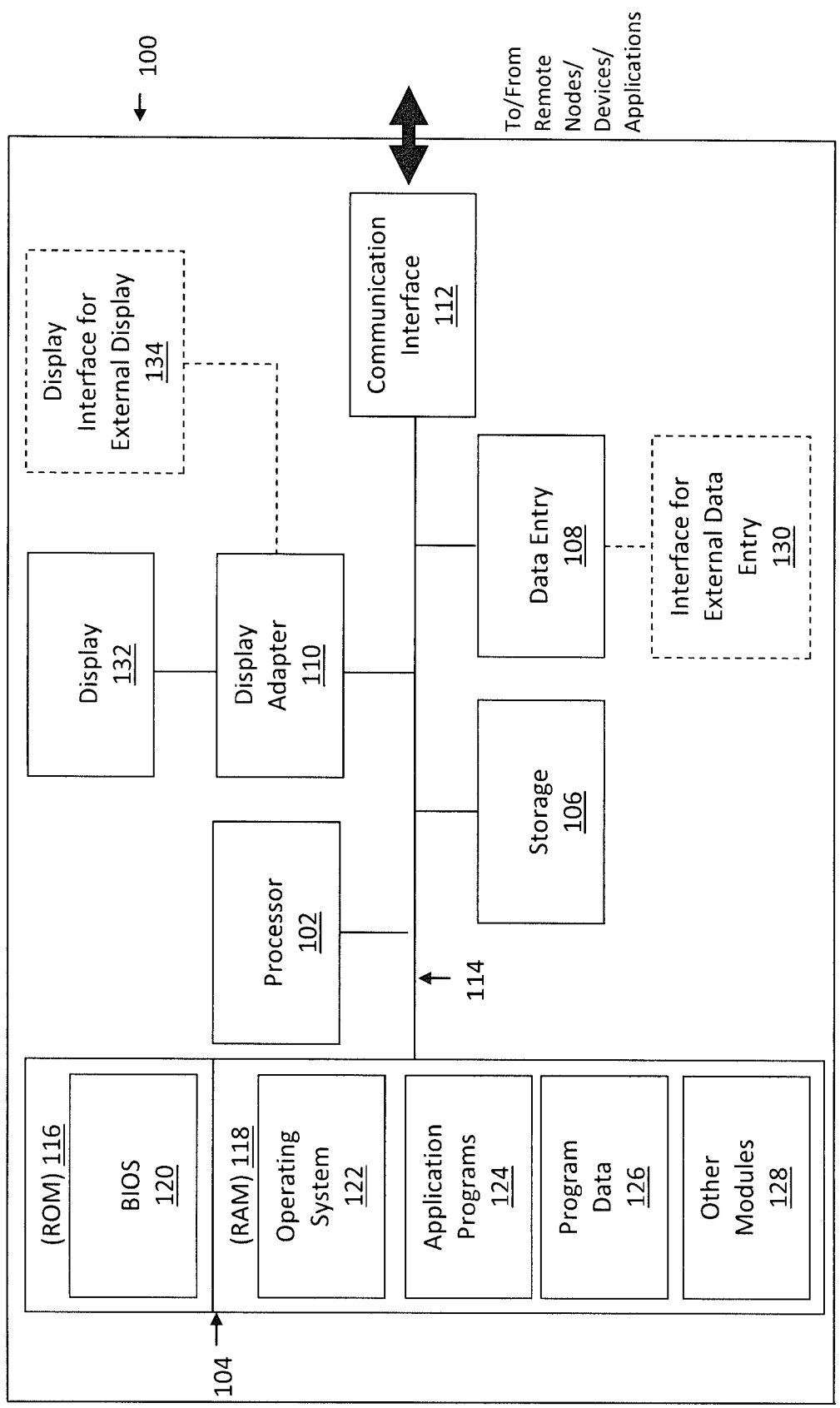
FIG. 1 is a block diagram illustrating an example hardware device in which the subject matter may be implemented.

The subject matter presented herein provides client-server communication in a cached communication environment that provides solutions to prior art problems. Many prior art client server models use communication applications executing on the client and the server to synchronize the communication object by updating an unmodified copy of the object based on a modified copy of the object. For example, if the client modifies the client's copy of the object to request the deletion of an email XYZ stored in the server's email archive, the communication applications update the server's copy of the object to reflect the request to delete the email, and the server deletes the email based on the request. Many prior art client-server models enable both the client and the server to modify their own copies of the object used to communicate data when the client and server are offline. For example, while the client-server communication is temporarily lost, the server modifies its copy of the object to indicate the message has been deleted. Meanwhile the client modifies its own copy of the object to initiate a request for the server to delete a previously received email ABC, which is also stored in the server's email archive. When online communication is reestablished between the client and the server, communication applications executing on the client and the server attempt to synchronize the one object based on their differing copies of the object with the client and the server. Since these prior art client-server models use a single object for communication purposes, such models will ignore one of the copies of the object, typically retaining the copy of the object with the most recent timestamp. If the confirmation of the deletion of the email XYZ has the most recent timestamp, the server will ignore the request to delete the email ABC, even though the client may indicate to a user that the client sent this deletion request. If the request to delete the email ABC has the most recent timestamp, the client will ignore the confirmation of the deletion of the email XYZ, even though the server's records may indicate that the server sent the confirmation of the email XYZ to the client. In either situation, the prior art client-server models lose data, and communication records in the client or the server become inaccurate and no longer match.

Embodiments herein enable client-server communication in a cached communication environment by providing a client object that only the client can modify, and an independent server object that only the server can modify, thereby reducing the loss of data that may occur after client-server communication is offline. For example, while client-server communication is offline, the server modifies the server object to confirm to the client that the email XYZ was deleted from the server archive, and the client modifies the client object to send client-data requesting to delete the previously received email ABC from the server's archives. When client-server communication is reestablished, communication applications executing on the client and the server synchronize the independent objects by modifying the server's copy of the client object to request the deletion of the email ABC in the server's archive, and by modifying the client's copy of the independent server object to confirm to the client email XYZ was deleted from the server's archive. Independent objects for both the client and the server ensure that both objects are retained when client-server communication is reestablished, thereby reducing the risk of losing the data referenced in the offline modifications to objects.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for client-server communication in a cached communication environment.

The subject matter presented herein provides client-server communication in a cached communication environment that provides solutions to prior art problems. Many prior art client-server models enable both the client and the server to modify their own copies of the object used to communicate when the client and server are offline. When online communication is reestablished between the client and the server, communication applications executing on the client and the server attempt to synchronize the object based on the differing copies of the object with the client and the server. Since these prior art client-server models use a single object for communication purposes, such models will ignore one of the copies of the object. Therefore, the prior art client-server models lose some data stored in objects during offline modifications, and communication records in the client or the server become inaccurate and no longer match.

Embodiments herein enable client-server communication in a cached communication environment by providing a client object that only the client can modify and an independent server object that only the server can modify, thereby reducing the loss of data that may occur after client-server communication is offline. When client-server communication is offline, the client modifies the client object to communicate client data and the server modifies the server object to communicate server data. When client-server communication is reestablished, communication applications executing on the client and the server synchronize the independent objects by updating the server's copy of the client object and the client's copy of the server object. Independent objects for both the client and the server ensure that both objects are retained when client-server communication is reestablished, thereby reducing the risk of losing the data referenced in the offline modifications to the objects.

Figure 2:
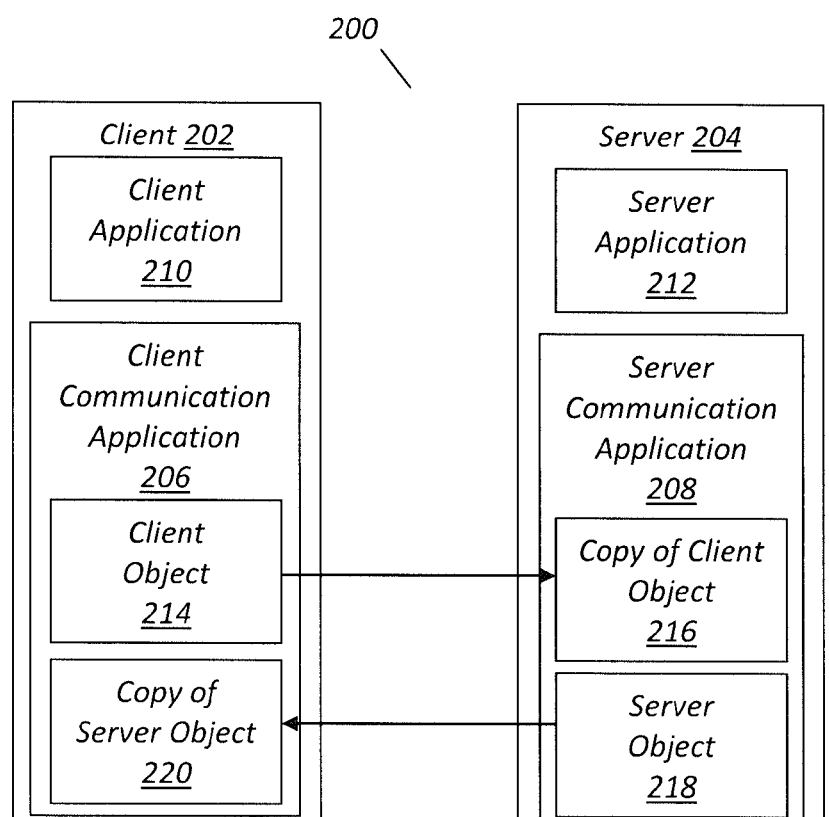
FIG. 2 illustrates a block diagram of an example system for client-server communication in a cached communication environment, under an embodiment.

FIG. 2 illustrates a block diagram of a system that implements client-server communication in a cached communication environment, under an embodiment. As shown in FIG. 2, system 200 may illustrate a cloud computing environment in which data, applications, services, and other resources are stored and delivered through shared datacenters and appear as a single point of access for the users. The system 200 may also represent any other type of distributed computer network environment in which servers control the storage and distribution of resources and services for different client users.

In an embodiment, the system 200 represents a cloud computing system that includes a client 202 and a server 204 that is provided by a hosting company. Although FIG. 2 depicts the system 200 with one client 202 and one server 204, the system 200 may include any number of clients 202 and servers 204. The client 202 and the server 204 may each be substantially similar to the system 100 depicted in FIG. 1. The client 202 includes a client communication application 206, and the server 204 includes a server communication application 208. The system 200 interacts with the communication applications 206-208, but does not need to modify the communication applications 206-208, which continue to function as the providers of the communication applications 206-208 intended. For example, the system 200 uses the same processes for the communication applications 206-208 to create an object for communication and synchronize an object. The client 202 also includes a client application 210, and the server 204 also includes a server application 212. The applications 210-212 implement embodiments of the present disclosure.

The client communication application 206 may be a client email application, such as Microsoft Outlook. In order to enable client-server communication, the client application 210 requests the client communication application 206 to generate a client object 214 that is stored in the client 202. The communication applications 206-208 synchronize the client 202 and the server 204 by the server communication application 208 generating a copy of the client object 216 in the server 204.

The server communication application 208 may be a server email application, such as Microsoft Exchange. In order to reduce the risk of losing the data referenced in the offline modifications to the objects, the server application 212 requests the server communication application 208 to generate an server object 218 that is independent from the client object 214 and stored in the server 204. The communication applications 206-208 synchronize the client 202 and the server 204 by the client communication application 206 generating a copy of the server object 220 in the client 202. When client-server communication is reestablished and the communication applications 206-208 synchronize the client 202 and the server 204, offline modifications to the client object 214 by the client application 210 have no direct effect on the server object 218, and offline modifications to the server object 218 by the server application 212 have no direct effect on the client object 214.

The client application 210 modifies the client object 214 to communicate client data. For example, the client application 210 modifies the client object 214 to communicate a request for the deletion of the previously received email ABC that is stored in the server's archive on the server 204. The data referenced in the client object 214 may be based on data reference in a copy of a server object. For example, the client application 210 replies to a previously received server object that provided the email QRS to the client 202 by modifying the client object 214 to communicate a reply to the email QRS that is stored on the server 204. In another example, the client application 210 modifies the client object 214 to communicate a request to store the previously received email ABC in a user-selected folder that is stored on the server 204.

The client communication application 206 communicates the data referenced in the client object with the server communication application 208 by synchronizing with the server communication application 208. For example, the client communication application 206 communicates the data that requests to delete the previously received email ABC from the email archive maintained by the server 204. The server communication application 208 receives and stores a copy of the client object 216, to delete the email ABC. The server application 212 receives the copy of the client object 216, such as the request to delete the email ABC from the server communication application 208.

Both the server communication application 208 and the client communication application 206 have access to their own copies of the client objects 214 and 216 and the server objects 218 and 220 even when the client 202 is not engaged in online communications with the server 204. While the client application 210 has write permission for the client object 214, policies for embodiments specify that the server application 212 lacks write permission for the copy of the client object 216. Since the server application 212 can only read the copy of the client object 216, the server application 212 cannot inadvertently or accidentally modify the copy of the client object 216, thereby preserving the copy of the client object 216 for retention of the data referenced in the copy of the client object 216. Therefore, the server application 212 never modifies the copy of the client object 216, thereby preventing the modification of the client object 214 based on differing copies of the client objects 214 and 216 when the communication applications 206 and 208 synchronize the client 202 and the server 204.

The server application 212 applies a disposition rule to the data referenced in the copy of the client object 216. For example, the server application 212-deletes the email ABC from the email archive (not pictured) maintained by the server 204. In another example, the server application 212 stores the email ABC in a user-specified folder in the email archive maintained by the server 204.

Similar to the reduction of lost data that could occur when the client 202 communicates client data to the server 204 after client-server communication is reestablished, embodiments also reduce the loss of data that could occur when the server 204 communicates server data to the client 202 after client-server communication is reestablished. The server application 212 modifies the server object 218 to communicate server data. For example, the server application 212 modifies the server object 218 to provide a confirmation that the email XYZ has been deleted to the client 202. The data referenced in the server object 218 may be based on data referenced in the copy of the client object 216. For example, the server application 212 applies a disposition rule to the data in the client object 216 that requested the deletion of email ABC by modifying the server object 218 to provide a confirmation of the deletion of the email ABC from the archives stored in the server 204.

The server communication application 208 communicates the server data, such as a confirmation of the client's request to delete the email XYZ, to the client communication application 206 by synchronizing with the client communication application 206. The client communication application 206 receives and stores a copy of the server object 220, such as the confirmation of the client's request to delete the email XYZ.

Both the server communication application 208 and the client communication application 206 have access to their own copies of the client objects 214 and 216 and the server objects 218 and 220 even when the client 202 is not engaged in online communications with the server 204. While the server application 212 has write permission for the server object 218, policies for embodiments specify that the client application 210 lacks write permission for the copy of the server object 220. Since the client application 210 can only read the copy of the server object 220, the client application 210 cannot inadvertently or accidentally modify the copy of the server object 220, thereby preserving the copy of the server object 220 for retention of data referenced in the copy of the server object 220. Therefore, the client application 210 never modifies the copy of the server object 220, thereby preventing the modification of the server object 218 based on differing copies of the server objects 218 and 220 when the communication applications 206 and 208 synchronize the client 202 and the server 204.

The client application 210 applies a disposition rule to the data referenced in the copy of the server object 220. For example, the client application 210 requests the client communication application 206 to delete the email XYZ from the local email archive maintained by the client 202, which retains a copy of the email XYZ stored on the server 204.

The client application 210 may reestablish consistency between the objects 214-220 stored in the client 202 and the server 204 following reestablishment of client-server communications by modifying the client object 214 based on the data referenced in the copy of the server object 220. For example, the client application 210 modifies the client object 214 to request the deletion of the previously received email ABC, the server application 212 receives the copy of the client object 216 that requests the deletion of the email ABC, and then the client-server communication is temporarily lost. Before the client-server communication is reestablished, the client application 210 modifies the client object 214 to request the deletion of the recently received email XYZ, and the server application 212 modifies the server object 218 to confirm the deletion of the email ABC. After the client-server communication is reestablished, the client object 214 reflects both the recent request to delete the email XYZ and the previous request to delete the email ABC. The client application 210 received the confirmation of the deletion of the email ABC, but the server application 212 has not had time yet to delete the email XYZ, much less confirm the deletion of the email XYZ. At this point in time, the client object 214 stored in the client 202 reflects two pending requests to delete emails and the copy of the client object 216 stored in the server 204 also reflects two pending requests to delete emails, even though the server 204 has already deleted one of the emails.

Therefore, the client application 210 modifies the client object 214 to remove the previous request to delete the email ABC based on the copy of the server object 220, and yet retain the current request to delete the email XYZ. By virtue of the client application 210 removing the request to delete the email ABC from the client object 214, the synchronization that occurs between the client communication application 206 and the server communication application 208, while both the client 202 and the server 204 are online, will update the server's copy of the client object 216. Consequently, the client object 214 stored in the client 202 reflects the pending request to delete the email XYZ while the copy of the client object 216 stored in the server 204 also reflects the pending request to delete the email XYZ. Similarly, the server application 212 may reestablish consistency between the objects 214-220 stored on the client 202 and the server 204 following reestablishment of client-server communication by modifying the server object 218 based on the copy of the client object 216.

Embodiments herein enable client-server communication in a cached communication environment by providing a client object that only the client can modify, and an independent server object that only the server can modify, which reduce the loss of data that may occur after client-server communication is offline. Independent objects for both the client and the server ensure that all objects are retained when client-server communication is reestablished, thereby reducing the risk of losing the data referenced in the offline modifications to objects.

Figure 3:
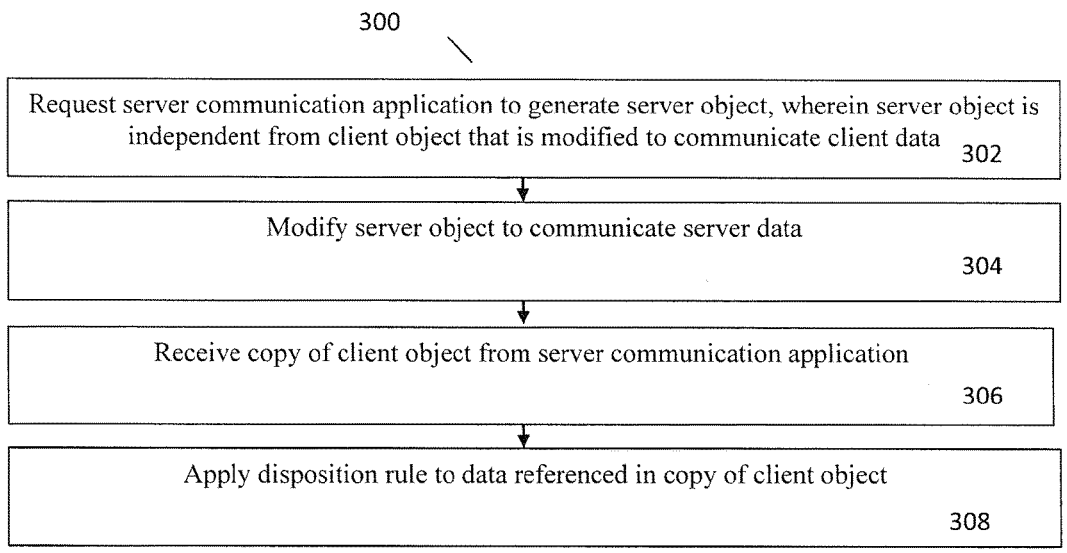
FIG. 3 is a flowchart that illustrates a method of client-server communication in a cached communication environment, under an embodiment.

FIG. 3 is a flowchart that illustrates a method of client-server communication in a cached communication environment. Flowchart 300 illustrates method acts illustrated as flowchart blocks for certain steps involved in and between the client 202 and the server 204 of FIG. 2.

The server communication application 208 is requested to generate the server object 218, wherein the server object 218 is independent from the client object 214 that is modified to communicate client data, act 302. For example, the server application 212 requests the server communication application 208 to generate the server object 218. When the communication applications 206-208 synchronize the client 202 and the server 204, the client communication application 206 generates the copy of the server object 220 in response to the server communication application 208 generating the server object 218.

The server object 218 is modified to communicate server data, act 304. For example, the server application 212 modifies the server object 218 to communicate server data that provides a confirmation of the deletion of the email XYZ to the client 202.

A copy of the client object 216 is received from the server communication application 208, act 306. For example, the server application 212 receives the copy of the client object 216 which includes data that requests the deletion of the previously received email ABC from the archives stored in the server 204.

A disposition rule is applied to data referenced in the copy of the client object 216, act 308. For example, the server application 212 responds the the client data that requests the deletion of the email ABC by requesting the server communication application 208 to delete the email ABC from the archives stored in the server 204. Following act 308, the flowchart 300 may terminate.

Although FIG. 3 depicts the acts 302-308 occurring in a specific order, the acts 302-308 may occur in another order. A server object that is independent from the client object ensures that an offline modification to a client object is retained when client-server communication is reestablished, thereby reducing the risk of losing the data referenced in the offline modifications to the client object 214.

Figure 4:
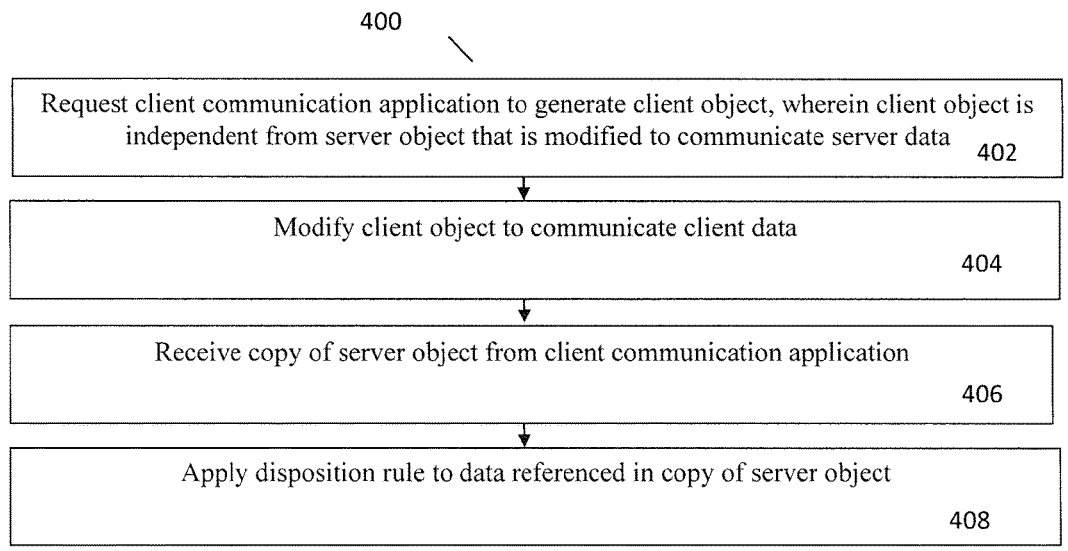
FIG. 4 is a flowchart that illustrates another method of client-server communication in a cached communication environment, under an embodiment.

FIG. 4 is a flowchart that illustrates another method of client-server communication in a cached communication environment. Flowchart 400 illustrates method acts illustrated as flowchart blocks for certain steps involved in and between the client 202 and the server 204 of FIG. 2.

The client communication application 206 is requested to generate the client object 214, wherein the client object 214 is independent from the server object 218 that is modified to communicate server data, act 402. For example, the client application 210 requests the client communication application 206 to generate the client object 214. When the communication applications 206-208 synchronize the client 202 and the server 204, the server communication application 208 generates the copy of the client object 216 in response to the client communication application 206 generating the client object 214.

The client object 214 is modified to communicate client data, act 404. For example, the client application 210 modifies the client object 214 to communicate the client data that requests to delete the email previously received ABC from the archives stored in the server 204.

A copy of the server object 220 is received from the client communication application 206, act 406. For example, the client application 210 receives the copy of the server object 220 that provides the confirmation of the deletion of the email XYZ.

A disposition rule is applied to data referenced in the copy of the server object 220, act 408. For example, the client application 210 deletes the local copy of the email QRS that is cached on the client 202, while the server 204 retains its copy of the email QRS. Following act 408, the flowchart 400 may terminate.

Although FIG. 4 depicts the acts 402-408 occurring in a specific order, the acts 402-408 may occur in another order. The client object 214 that is independent from the server object 218 ensures that an offline modification to the client object 214 is retained when client-server communication is reestablished, thereby reducing the risk of losing the data referenced in the offline modification to the client object 214.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for client-server communication in a cached communication environment, the system comprising:
   a processor-based server application, when executed on a server computer, causing the server computer to:
   request a server communication application to generate a server object for communicating server data to a client computer, the server object being stored on the server computer as a read and write object that is independent from a client object stored on the client computer that is used to communicate client data to the server computer;
   receive a copy of the client object from the server communication application, the copy of the client object being a read only object, the copy of the client object referencing the client data stored on the server computer and including a disposition rule to be applied to the referenced client data stored on the server computer;
   store the received copy of the client object on the server computer independently from the server object;
   apply the disposition rule included in the received copy of the client object to the client data stored on the server computer and referenced in the stored copy of the client object;
   modify the server object to communicate the server data to the client device after applying the disposition rule to the client data referenced in the copy of the client object when the client-server communication is lost, the modified server object including at least an indication that the disposition rule has been applied to the client data referenced in the copy of the client object; and
   transmit a copy of the modified server object to the client device when the client-server communication is re-established, the copy of the modified server object being a read only object for the client device to store independently from the client object.

2. The system of claim 1, wherein the server communication application is an email application.

3. The system of claim 1, further comprising a processor-based client application when executed on a client computer, causing the client computer to:
   request a client communication application to generate the client object;
   receive the copy of the server object from the client communication application; and
   apply another disposition rule to the server data referenced in the copy of the server object.

4. The system of claim 3, wherein the processor-based client application, when executed on the client computer, further causing the client computer to modify the client object to communicate client data.

5. The system of claim 4, wherein the data referenced in the client object is based on the data referenced in the copy of the server object.

6. The system of claim 4, wherein the processor-based client application, when executed on the client computer, further causing the client computer to modify the client object based on the copy of the server object.

7. The system of claim 3 wherein the client communication application is an email application.

8. A computer-implemented method for client-server communication in a cached communication environment, the method comprising:
   requesting a server communication application to generate a server object for communicating server data to a client computer, the server object being stored on the server computer as a read and write object that is independent from a client object stored on the client computer that is used to communicate client data to the server computer;
   receiving a copy of the client object from the server communication application, the copy of the client object being a read only object, the copy of the client object referencing the client data stored on the server computer and including a disposition rule to be applied to the referenced client data stored on the server computer;
   storing the received copy of the client object on the server computer independently from the server object;
   applying the disposition rule included in the received copy of the client object to the client data stored on the server computer and referenced in the stored copy of the client object;
   modifying the server object to communicate the server data to the client device after applying the disposition rule to the client data referenced in the copy of the client object when the client-server communication is lost, the modified server object including at least an indication that the disposition rule has been applied to the client data referenced in the copy of the client object;
   transmitting a copy of the modified server object to the client device when the client-server communication is re-established, the copy of the modified server object being a read only object for the client device to store independently from the client object.

9. The method of claim 8 further comprising:
   requesting a client communication application to generate the client object;
   receiving the copy of the server object from the client communication application; and
   applying another disposition rule to the server data referenced in the copy of the server object.

10. The method of claim 9 further comprising modifying the client object to communicate client data.

11. A computer program product, comprising a non-transitory computer-readable medium having a computer-readable program code embodied therein, the computer-readable program code adapted to be executed by one or more processors, the program code including instructions to:
  request a server communication application to generate a server object for communicating server data to a client computer, the server object being stored on the server computer as a read and write object that is independent from a client object stored on the client computer that is used to communicate client data to the server computer;
  receive a copy of the client object from the server communication application, the copy of the client object being a read only object, the copy of the client object referencing the client data stored on the server computer and including a disposition rule to be applied to the referenced client data stored on the server computer;
  store the received copy of the client object on the server computer independently from the server object;
  apply the disposition rule included in the received copy of the client object to the client data stored on the server computer and referenced in the stored copy of the client object;
  modify the server object to communicate the server data to the client device after applying the disposition rule to the client data referenced in the copy of the client object when the client-server communication is lost, the modified server object including at least an indication that the disposition rule has been applied to the client data referenced in the copy of the client object; and
  transmit a copy of the modified server object to the client device when the client-server communication is reestablished, the copy of the modified server object being a read only object for the client device to store independently from the client object.

12. The computer program product of claim 11, the program code including further instructions to:
  request a client communication application to generate the client object;
  receive the copy of the server object from the client communication application; and
  apply another disposition rule to server data referenced in the copy of the server object.

13. The computer program product of claim 12, the program code including further instructions to modify the client object to communicate client data.

* * * * *